United States Patent [19]

Held et al.

[11] 3,862,871
[45] Jan. 28, 1975

[54] DRUM FOR BUILDING AND SHAPING BLANKS FOR RADIAL-PLY TYRES

[75] Inventors: Gerhard Held, Hochstadt; Walter Balle, Dornigheim-Waldsiedlung, both of Germany

[73] Assignee: Leonhard Herbert Maschinenfabrik, Bergen-Enkheim, Germany

[22] Filed: July 12, 1972

[21] Appl. No.: 271,125

[30] Foreign Application Priority Data
July 13, 1971 Germany............................ 2134904

[52] U.S. Cl................... 156/415, 156/133, 156/414
[51] Int. Cl....................... B29h 17/10, B29h 17/16
[58] Field of Search .......... 156/110, 123, 124, 126, 156/131, 132, 133, 135, 398, 400, 401, 414–417

[56] References Cited
UNITED STATES PATENTS

| | | | |
|---|---|---|---|
| 1,458,732 | 6/1923 | Sloper | 156/126 |
| 1,785,659 | 12/1930 | State | 156/126 |
| 3,014,521 | 12/1961 | Barber | 156/416 |
| 3,035,629 | 5/1962 | Vanzo et al. | 156/415 |
| 3,053,308 | 9/1962 | Vanzo | 156/415 |
| 3,402,090 | 9/1968 | Henley | 156/398 |
| 3,434,897 | 3/1969 | Caretta et al. | 156/133 |
| 3,698,987 | 10/1972 | Woodhall et al. | 156/132 |

FOREIGN PATENTS OR APPLICATIONS

| | | | |
|---|---|---|---|
| 222,190 | 4/1958 | Australia | 156/131 |
| 641,709 | 5/1962 | Canada | 156/131 |
| 1,256,267 | 4/1959 | France | 156/414 |

*Primary Examiner*—Clifton B. Cosby
*Assistant Examiner*—John E. Kittle
*Attorney, Agent, or Firm*—Woodhams, Blanchard and Flynn

[57] ABSTRACT

A drum for building and shaping blanks for radial-ply tyres comprises two co-axial bead holders at least one of which has an extension drum which is co-axial therewith, is secured thereto and has the same outside diameter. the extension drum acts in part as a support for a tyre band while the latter is being secured to the bead holders for shaping. The bead holders are movable axially relative one to the other to position the tyre band for shaping and each is provided with radially movable segments to which end portions of the tyre band are secured in airtight manner. During relative axial movement of the bead holders towards each other, a gaseous medium is introduced into the space bounded by the bead holders and the tyre band so that the band is curved outwards to form a tyre blank.

15 Claims, 15 Drawing Figures

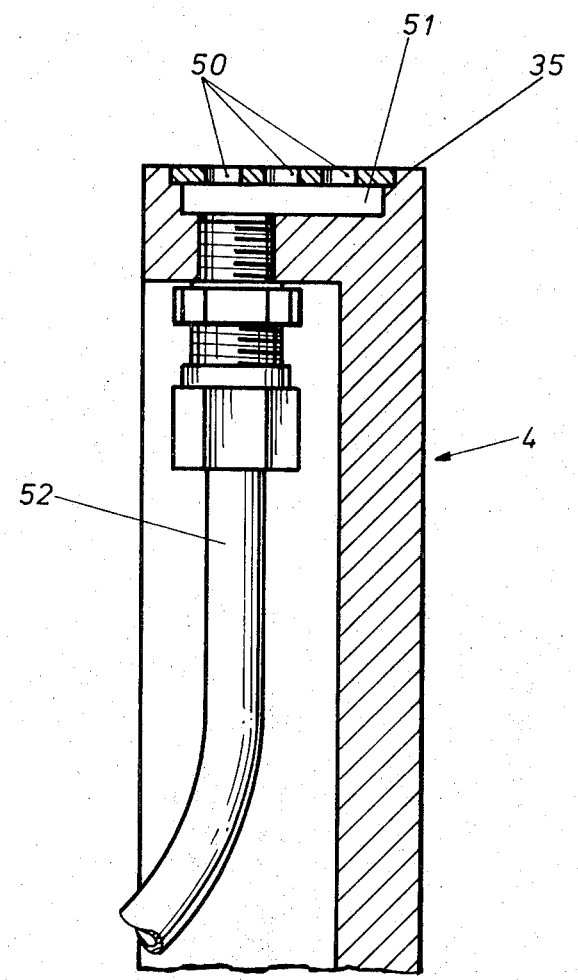

DRUM FOR BUILDING AND SHAPING BLANKS FOR RADIAL-PLY TYRES

BACKGROUND OF THE INVENTION

1. Field of the Invention

The invention relates to a drum for building and shaping a blank for a radial-ply tyre.

2. Description of the Prior Art

In the building of a tyre the procedure generally comprises forming one or more cord webs into a cylindrical body on a tyre building drum. This body is then given a toric shape either in a special expanding apparatus or in a tyre heating press. In the manufacture of radial-ply tyres it is usually necessary to carry out the expanding operation before introduction into a tyre heating press, since the belt must previously be fastened to the tyre blank.

In one known apparatus, as disclosed in U.S. Pat. No. 3,402,090 and German Offenlegungsschrift No. 1,579,266, an expanding drum has bead holders with which the beads of a previously built carcass can be brought into airtight engagement. For this purpose the bead holders have radially expansible grooves. Before the carcass is placed on the expanding machine, it must be built by winding a fabric band on a separately installed building drum. The known complete arrangement consisting of the building drum and the expanding drum necessitates additional operations for transferring the carcass, while still in its cylindrical shape, to the expanding drum.

SUMMARY

The problem underlying the present invention consists in further developing a machine of the above kind in such a way that transport from a building drum to an expanding drum is not necessary.

According to the invention there is provided a drum for building and shaping a blank for a radial-ply tyre, said drum comprising two co-axial bead holders supported for axial movement relative one to the other towards and away from a starting position thereof in which the bead holders are located in relatively close relation, each said bead holder being provided with radially movable elements the extent of radial movement of which is determined by grooves formed in the bead holders and in which lateral extensions of said elements are located, a chamber formed in each bead holder, said chambers being arranged to be in communication one with the other when the bead holders are spaced axially from the starting positions thereof and to be airtightly closed by a tyre band applied peripherally to and extending between the bead holders, means arranged to introduce a fluid pressure medium into the chambers when closed by the tyre band, and an extension drum co-axial with and extending from that face of at least one bead holder which is remote from the other bead holder.

In the apparatus according to the invention a central drum, which would obstruct the movement of the bead holders towards one another during the expanding operation, is not provided between the bead holder parts which are movable relative to one another. When working with an apparatus according to the invention the tyre band is laid partly on the bead holders and partly on an extension drum or drums. The bead holder parts are them moved so far apart that the edges of the tyre band reach their correct position relative to the bead holders. During this adjusting movement the tyre band is drawn off in the axial direction from the extension drum or drums. Through the arrangement of extension drums on the outer sides of the bead holders, it is possible to eliminate the obstructive intermediate drums, which can be used at all only if by means of a complicated construction they are made either axially collapsible or adapted to be removed radially inwards, in which case it is also necessary to make provision for the bead holders to be moved axially towards one another. The fabric from which the carcass is to be formed is firmly supported, which is important for the obtaining of an accurate shape. By combining the building drum and expanding apparatus it is possible to eliminate a transport operation, thereby achieving not only a saving in labour, but also a saving of space, since it is no longer necessary for intermediate storage to be provided for cylindrical carcasses awaiting further processing in an expanding apparatus.

Further according to the invention there may be provided between the bead holders at least one supporting element co-axial with the bead holders and arranged to be moved axially relative thereto on movement of the bead holders from the starting positions thereof so as to be symmetrically located between the bead holders. Although these supporting elements are not necessary in every case, they nevertheless make it impossible for the tyre band to sag excessively downwards at the top in consequence of its own weight during the axial movement of the bead holders away from one another. The supporting elements are particularly advantageous in connection with heavy tyre bands having little stiffness.

Still further according to the invention an extension drum may be associated with one only of the bead holders and the other bead holder is provided with a fastening device for the axial fastening thereto of a tyre band. In an embodiment in which extension drums adjoin both tyre holders it is advantageous for a fastening device to be provided for the supporting element or for one of the supporting elements. Fastening devices of this kind ensure that after the bead holders have been moved apart the tyre band will be in its exactly correct position in relation to the bead holders.

It is however possible to dispense with fastening devices when working with a tyre building drum which has an extension drum on only one bead holder, if the following procedure is adopted: the tyre band is laid on the drum in such a manner that one side edge of the tyre band is correctly aligned in relation to the bead groove of the bead holder not provided with an extension drum. Thereupon a bead core is placed in position over the groove of the bead holder in question and by expanding the bead groove the type band is drawn into the latter and secured there by the bead core. The tyre band is thereby fastened in relation to the bead holder in question. The latter is then moved away from the other bead holder until the opposite edge of the tyre band has assumed its correct position relative to the bead holder provided with an extension drum. During this movement the tyre band is drawn off from the extension drum. When the correct position in relation to the bead holder has been reached, the next bead core is clamped in position. The expanding operation can then take place in the usual way.

BRIEF DESCRIPTION OF THE DRAWINGS

FIG. 15 shows a portion of FIG. 14 in the region of the box XV shown in dot-dash lines in FIG. 14.

DESCRIPTION OF THE PREFERRED EMBODIMENTS

Figure 1:
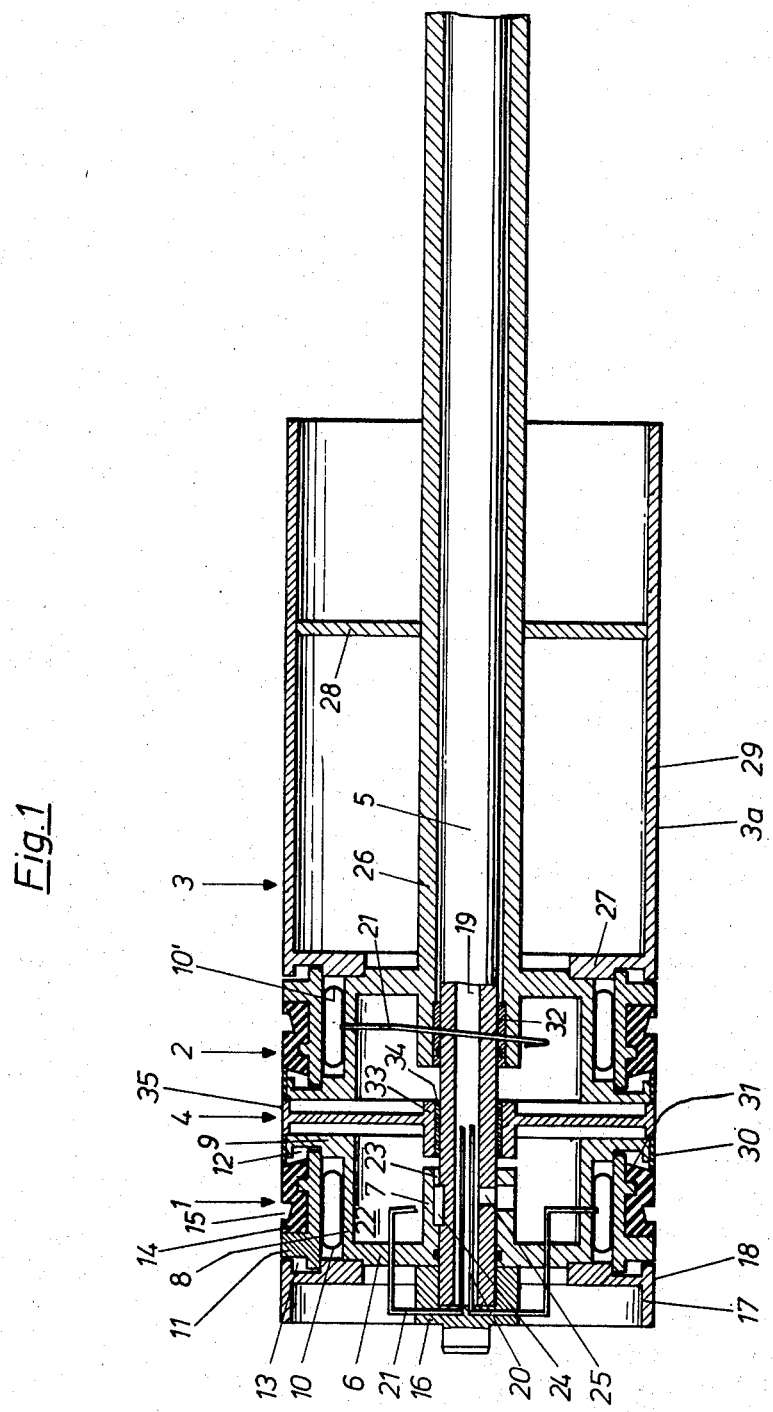
FIG. 1 is a longitudinal section through a tyre building drum according to one embodiment of the invention, the drum being shown in the collapsed condition before a tyre band is placed in position.

Referring to FIGS. 1 to 10 of the drawings, the main parts of the tyre-building drum are a first bead holder 1, a second bead holder 2, an extension drum 3 attached to the outer side of the bead holder 2, and a supporting element 4 disposed between the bead holders 1 and 2.

The first bead holder 1 is fastened on the end of an axially slidable hollow bar 5. The bead holder 1 has a disc-shaped part 6 with a hub 7, which is mounted on the hollow bar 5. A cylindrical part 8 connects the part 6 with a radial part 9 parallel to the disc-shaped part 6. The bead holder 1 is fastened to the hollow bar 5 for rotation therewith by a key 24 engaged in a keyway 23 in the hub 7.

The outer surface of the cylindrical part 8 serves as support for a flexible hose 10, against the outer side of which rigid segments 11 bear. Laterally extending projections on the segments 11 engage in annular grooves 12 and 13 bounding the radial path of movement of the segments 11. The segments 11 are surrounded by a continuous resilient part 14 provided with an annular groove 15, which is intended to receive a bead core, as will be further described below. On the outer surface of the radial part 9 is fastened an elastic band 30 one edge of which lies against a conical surface 31 of the resilient part 14. The purpose of the band 30 is to seal a chamber 22 from atmosphere. If the band 30 were not provided, communication to atmosphere would be established through the slots between the segments 11. A cap 16 mounted on the end of the hollow bar 5 secures the bead holder 1 axially.

On the outer side of the bead holder 1 there is fastened centrally a short extension 17, the cylindrical outer surface 18 of which has the same diameter as that of the bead holder 11 when the segments 11 are in their radially inner position, as illustrated in FIG. 1.

Pressure-medium pipes 20 and 21 are disposed in a cavity 19 in the bar 5. The pipe 20 leads into the interior of the hose 10 and the pipe 21 into the interior of the hose 10'. In the drawing part of the pipe 21 is broken away. The chamber 22 is in communication with the cavity 19 in the bar 5 by way of a radial bore 25 in the hollow bar 5 and a bore provided in the hub 7 and in line with the bore 25.

The bead holder 2 is substantially of the same construction as the bead holder 1. It is, however, the mirror image of the bead holder 1 and is not fastened on the hollow bar 5 but on a hollow shaft 26 surrounding the bar 5. Pressure medium is supplied to the hose 10' through the pipe 21, which is independent of the pipe 20, in such a manner that the flow of pressure medium in the pipe 21 can be controlled independently of the flow of pressure medium in the pipe 20.

The extension drum 3 is fastened on the outer right-hand side of the bead holder 2. The cylindrical surface 3a of this drum has the same diameter as that of the bead holders 1 and 2 and the extension part 17 when the segments 11 of the bead holders 1 and 2 are in their radial inner position, which is shown in FIG. 1. For the purpose of fastening and centering it on the bead holder 2, the extension drum 3 has a radial part 27. Because of its relatively great length the extension drum is supported on the hollow shaft 26 in its rear region by means of a disc 28. The drum 3 has a closed peripheral surface 29 and it may be made in one piece.

As already stated, the supporting element 4 is disposed between the two bead holders 1 and 2. The supporting element 4 is in the form of a disc and has a hub 33 housing a bearing bush 34, which is a bearing for the hollow bar 5. The peripheral surface 35 of the supporting element 4 also has the same diameter as that of the bead holders 1, 2 and the extension drum 3.

The hollow bar 5 is arranged to slide out of the shaft 26 towards the left as viewed in FIG. 1. A bearing bush 32 on the shaft 26 serves to centre the bar 5 in the shaft 26. The movement mechanism is not illustrated. Conventional means may be used for this purpose, such as for example hydraulic cylinders or threaded spindles. Moreover, the entire unit illustrated is mounted for rotation, the mounting and drive also not being shown.

The supporting element 4 is provided with a movement device (not shown), by means of which on the movement of the bead holders 1, 2 away from one another, that is to say on the movement of the bead holder 1 to the left as viewed in FIG. 1, the supporting element 4 is moved to the left at half speed, so that it is always situated centrally between the two bead holders 1 and 2.

The mode of operation of the tyre-building drum will now be explained with reference to FIGS. 1 to 10.

Figure 2:
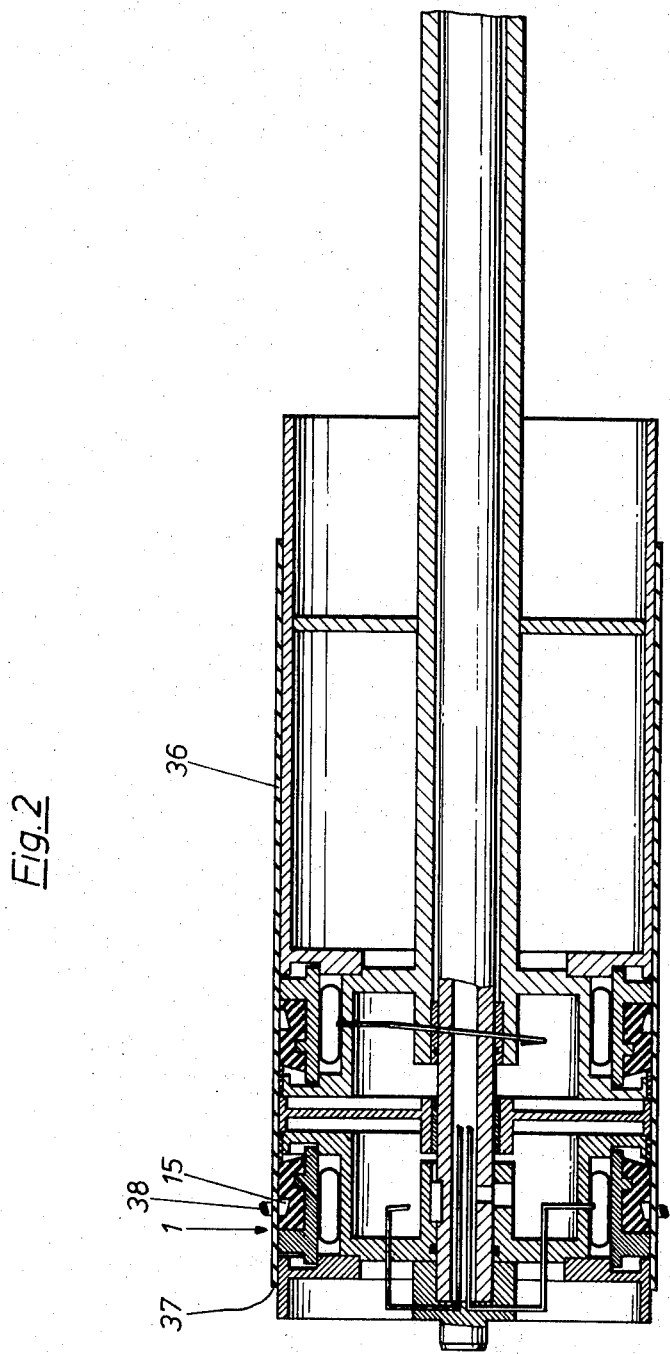
FIGS. 2 to 10 show various phases of the work with a tyre building drum according to FIG. 1.

In FIG. 1 the building drum is shown in the starting position and forms a cylinder with a substantially smooth surface. In FIG. 2 a radial carcass ply for building a tyre band 36, which may include a steel wire reinforcement, has been laid on the drum. The left-hand edge 37 of the tyre band 36 is situated at the desired distance from the annular groove 15 of the left-hand bead holder 1. Above the annular groove 15 a bead core 38 has been placed in position and is held in this position by means of an auxiliary device (not shown). During the placing in position of the tyre band 36 the entire drum has performed a revolution.

Figure 3:
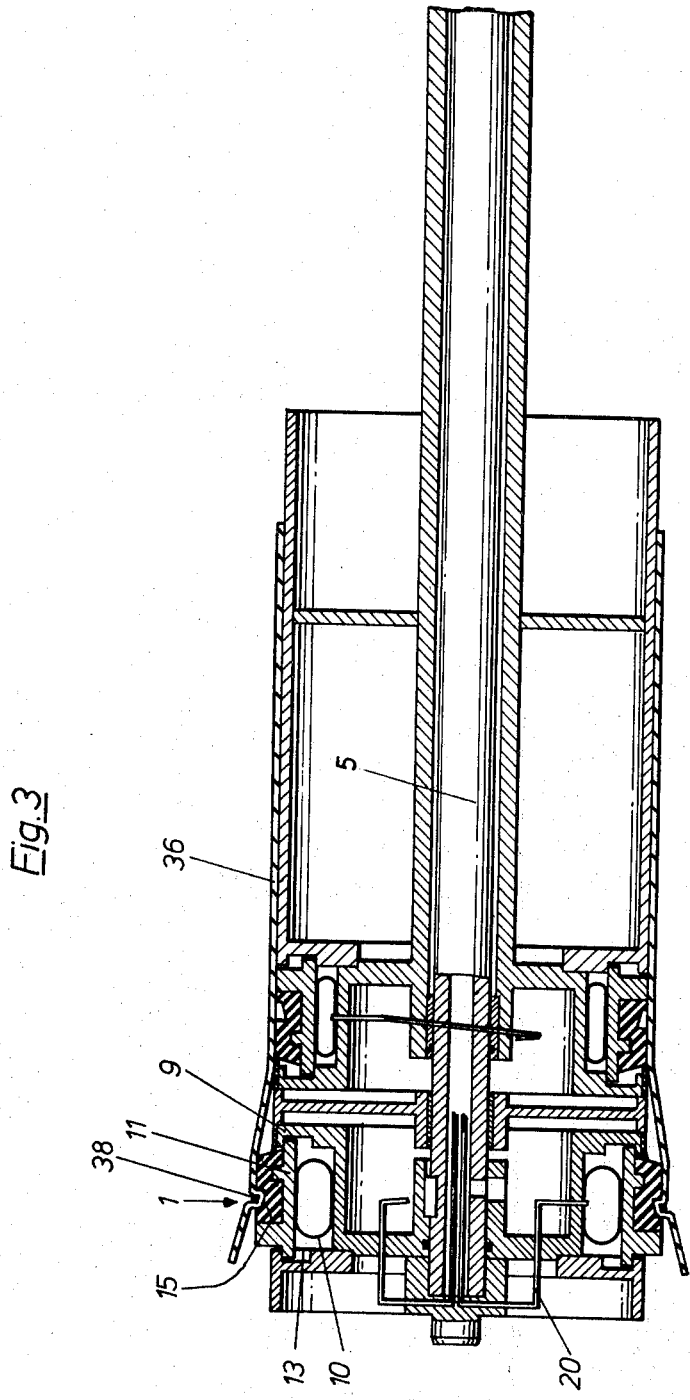

In the position shown in FIG. 3 the left-hand bead holder 1 has been expanded radially. This was effected by introducing a pressure medium into the hose 10 through the pressure medium pipe 20. The segments 11 have thereby been moved into their radially outermost position, which is limited by the bearing of the segments against the outer boundary walls of the annular grooves 12 and 13. As the bead holder 1 expanded, the bead core 38 pushed the tyre band 36 into the annular groove 15. The bar 5 is now moved to the left, so that the left-hand bead holder 1 finally reaches the position shown in FIG. 4. The supporting element 4 has moved at half-speed (the drive means achieving this is not shown) and has reached the position shown in FIG. 4, and is thus situated centrally between the bead holders 1 and 2. During the movement of the bead holder 1 the tyre band 36 was pulled off the extension drum 3. The tyre band was obliged to follow the pulling-off movement because it was held fast on the bead holder 1 by the bead core 38. The bead holder 1 moves to the left until the right-hand edge 39 of the tyre band 36 is situated the desired distance from the annular groove 15'.

Figure 4:
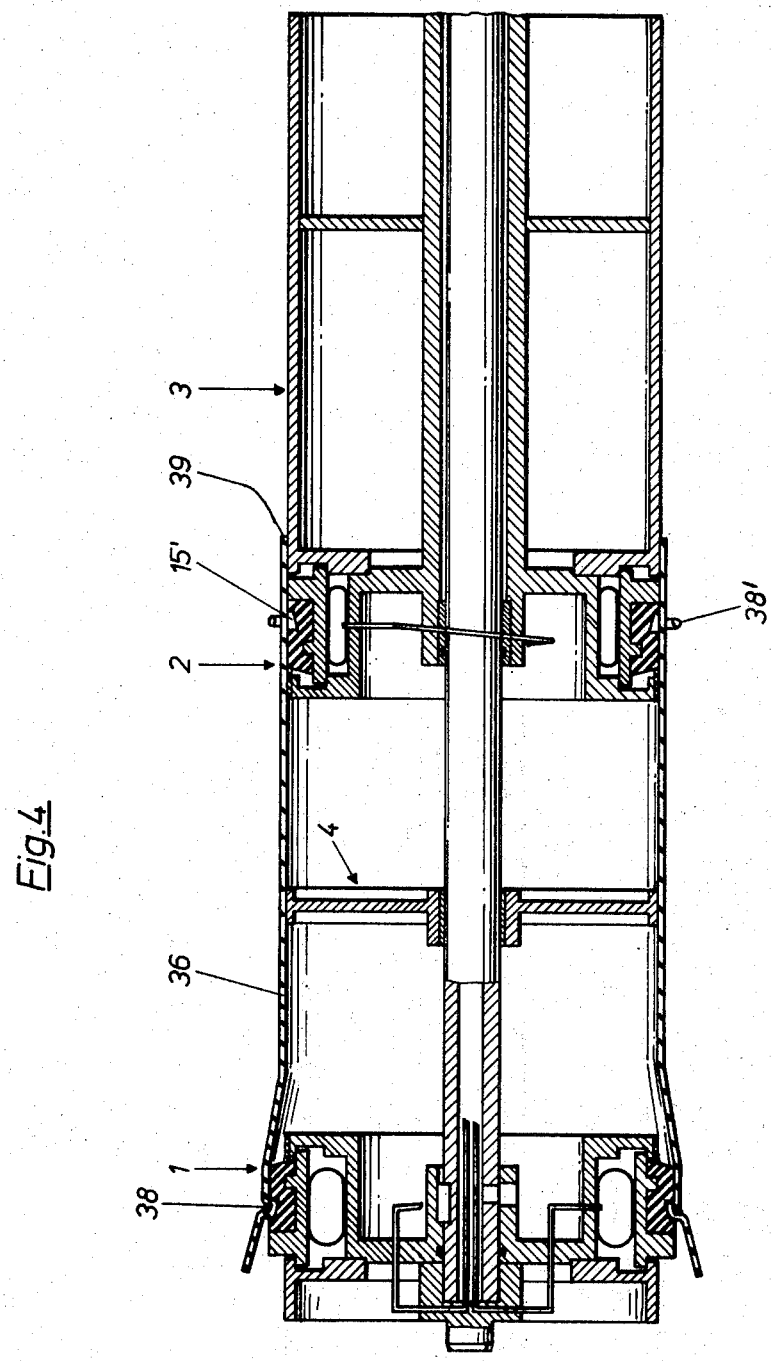
Figure 5:
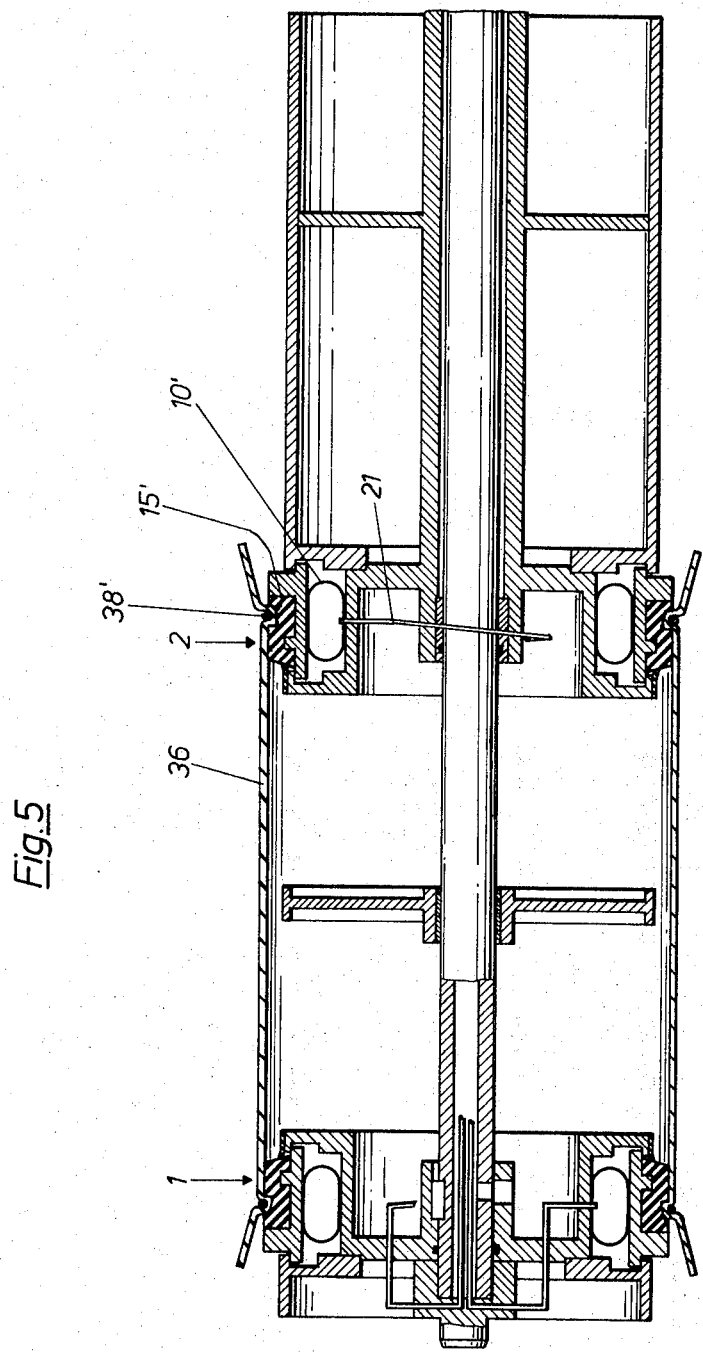

The right-hand bead holder 2 is now brought to the same diameter as the left-hand bead holder 1, after a bead core 38' has first been brought into position above the annular groove 15' (see FIG. 4). The bead core 38' now presses the tyre band 36 into the bead groove 15'. Expansion being effected by introducing pressure medium into the hose 10' through the pressure medium pipe 21.

Figure 6:
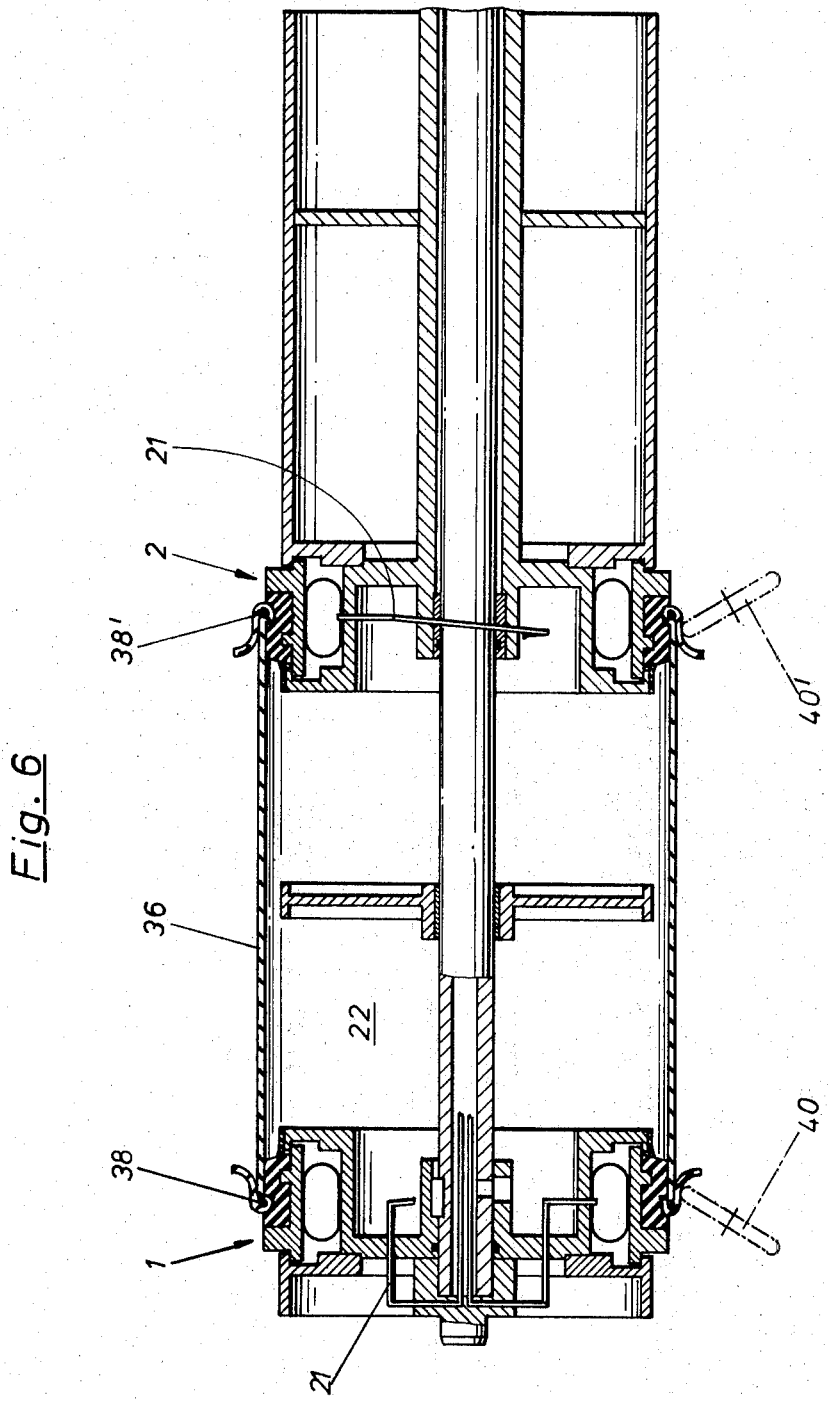

The drum is now rotated and the ends of the tyre band 36 projecting beyond the bead core 38, 38' are bent over by means of pressing rollers 40 and 40', which are indicated by broken lines in FIG. 6.

Figure 7:
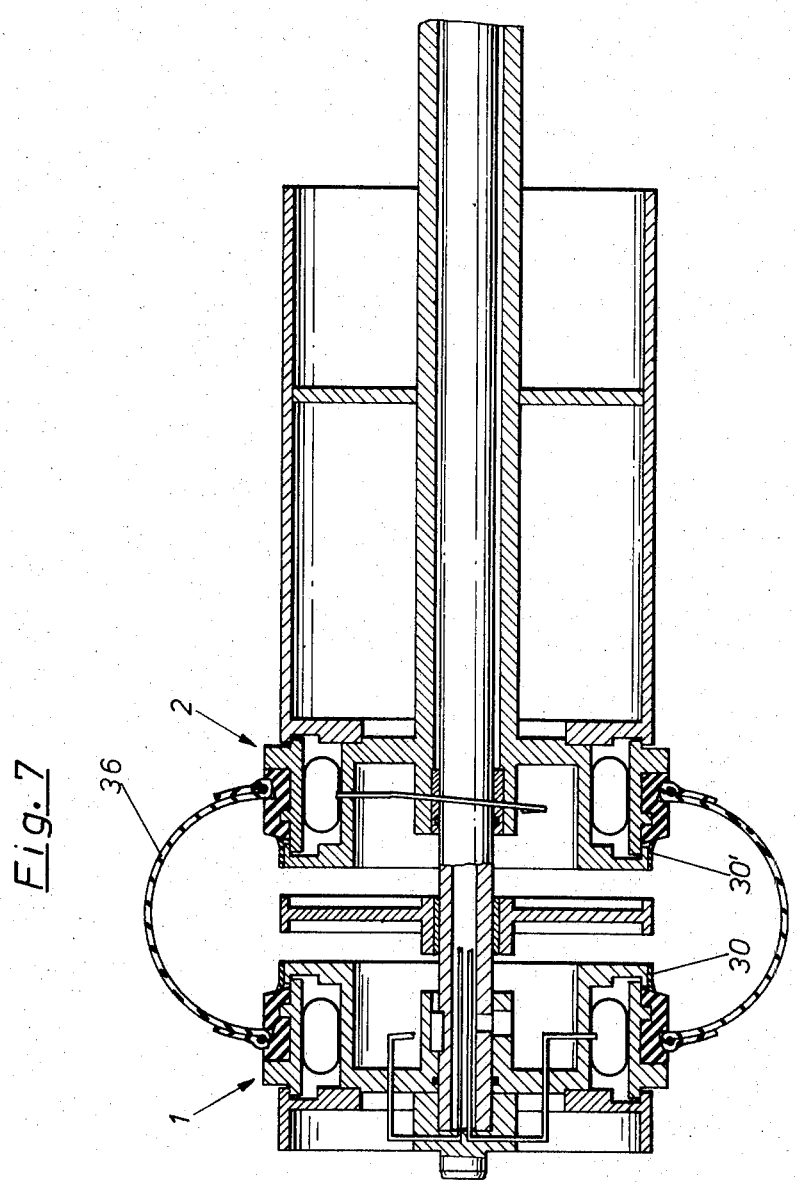
Figure 8:
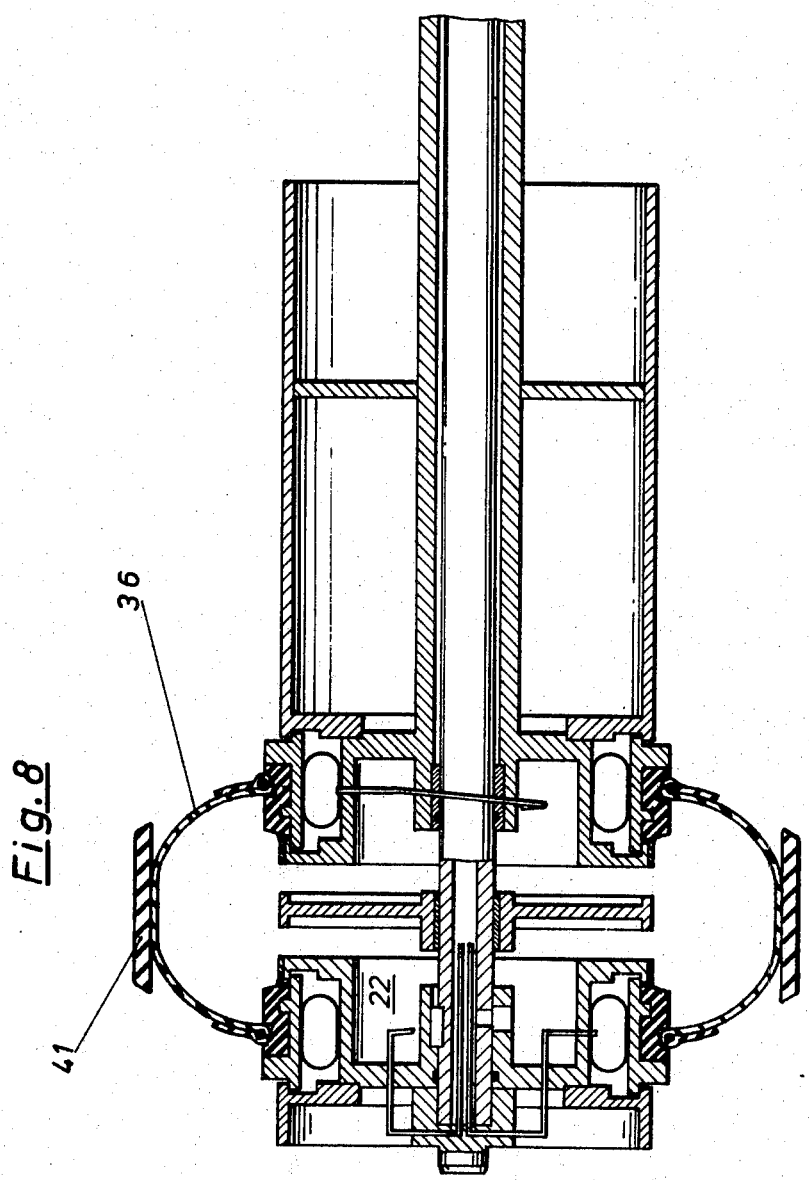

After the projecting ends have been bent over until they lie entirely on the layer of cord web situated beneath them, a pressure medium, preferably air, is introduced into the chamber 22 through the cavity 19 in the bar 5 and the radial bore 25. At the same time the bead holder 1 moves back to the right, as viewed in FIG. 1, towards the bead holder 2, so that the tyre band 36 is curved into a toric shape. This shape is shown in FIG. 7. The left-hand holder 1 has here not quite been moved to the position in which it lies against the bead holder 2. A belt 41, FIG. 8, is now fastened on the curved tyre band 36. The belt is placed in position with the aid of an auxiliary device (not shown) and the tyre band 36 is pressed from inside against the belt 41 by the compressed air in the chamber 22. In FIG. 7 the sealing function of the elastic bands 30, 31' can also be clearly seen, these bands preventing pressure medium from flowing out through the slots between the segments 11.

Figure 9:
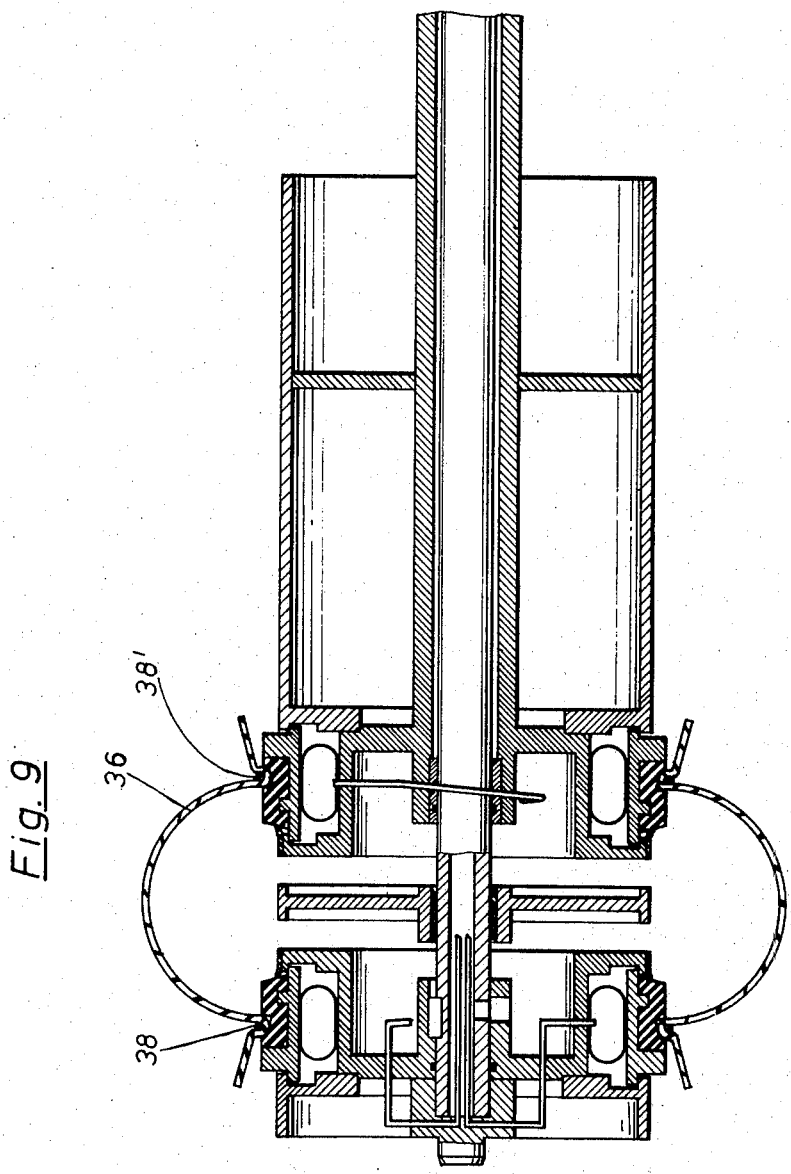
Figure 10:
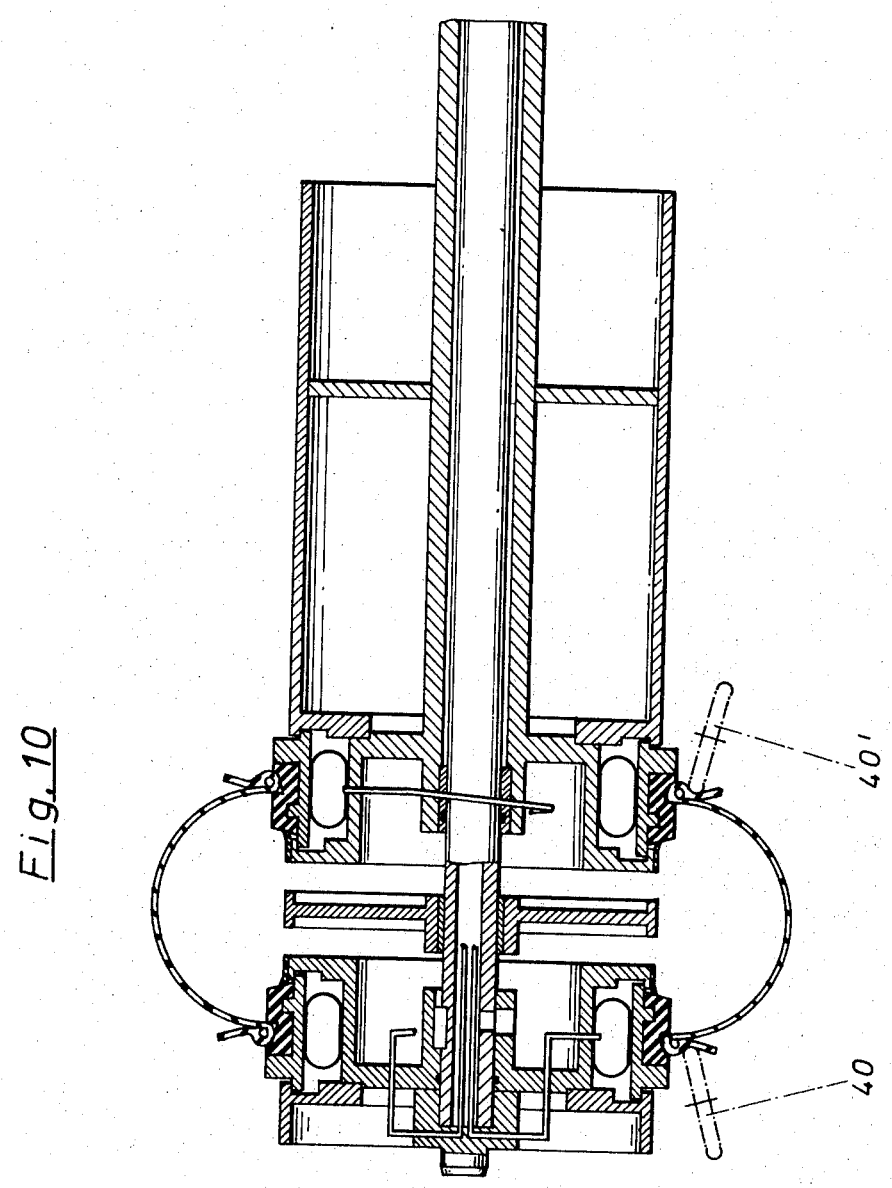

FIGS. 9 and 10 illustrate an alternative method of working. In this alternative the ends of the band projecting beyond the bead core 38, 38' are not bent over before the band is curved into shape. Bending-over is effected after the curved shape has been achieved, as illustrated in FIG. 10 in which once again the pressure rollers 40 and 40' are shown by broken lines. As compared with the previously described method according to FIGS. 1 to 8 this method provides the advantage that displacements, which otherwise occur to a certain extent during the curving movement, cannot occur inside the tyre bead after the ends of the band have been folded over.

Figure 11:
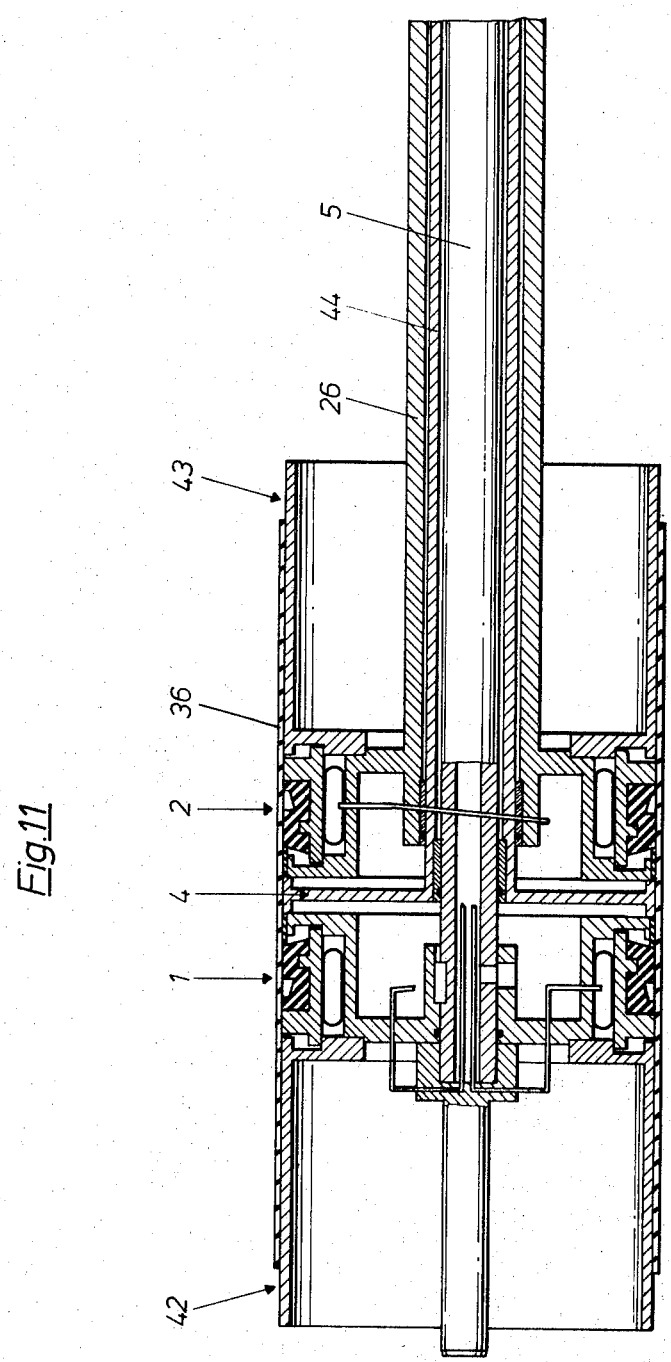
FIG. 11 is a longitudinal section through an alternative form of the tyre-building drum.

FIG. 11 illustrates another embodiment. In this case also two bead holders 1 and 2 are provided. An extension drum 42, 43 is disposed on each of the bead holders. The two extension drums 42, 43 are of equal length. A supporting element 4 is also provided. This element is disposed on a hollow bar 44 surrounding the bar 5. The bar 44 is surrounded by a hollow shaft 26 corresponding to the example of embodiment previously described.

Figure 12:
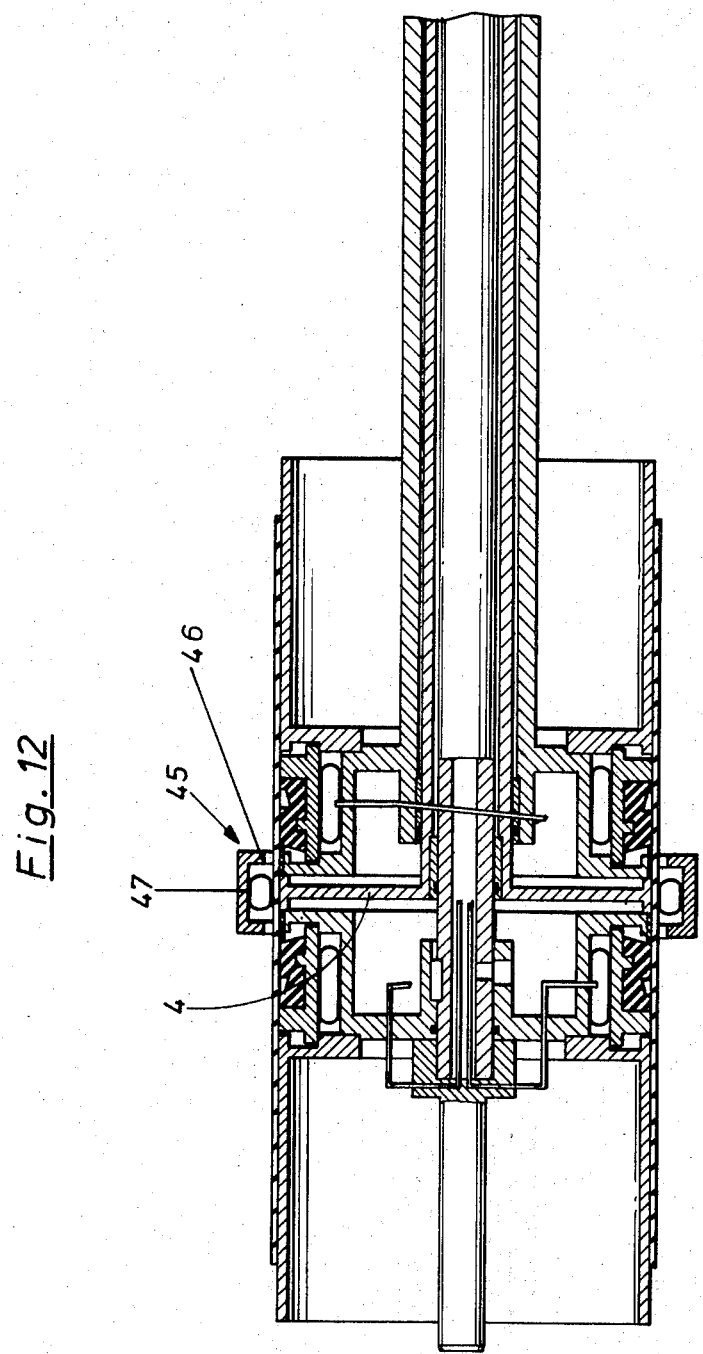
FIGS. 12 and 13 show various phases of the work with a tyre building drum according to FIG. 11.

The drum shown in FIG. 11 is also provided with the fastening device 45 shown in FIG. 12. This device has a ring 46 which surrounds the drum and on the inner side of which an inflatable hose 47 is disposed.

With the drum as shown in FIGS. 11 and 12 described, the procedure is as follows. As before, a tyre band is placed in position while the drum is rotated. Thereupon, as shown in FIG. 12, the fastening device 45 is placed above the supporting element 4. The hose 47 is thereupon inflated and pushes the tyre band 36 against the outer periphery of the supporting element 4. The bead holders 1 and 2 are now moved apart so that they are situated at equal distances from the supporting element 4. The bead holders 1, 2 are moved apart until the edges 37 and 39 of the tyre band 36 project the desired distances beyond the annular grooves 15, 15'.

It is immaterial how the relative movements are performed. It is possible for the right-hand bead holder 2 to be stationary while the supporting element 4 and the bead holder 1 are moved to the left, while it is also possible for the supporting element 4 to be stationary and for the holders 1 and 2 to move to the left and right respectively away from the supporting element 4. Other movements are naturally also possible. It is merely essential that the final conditions shown in FIG. 13 should be achieved.

Figure 13:
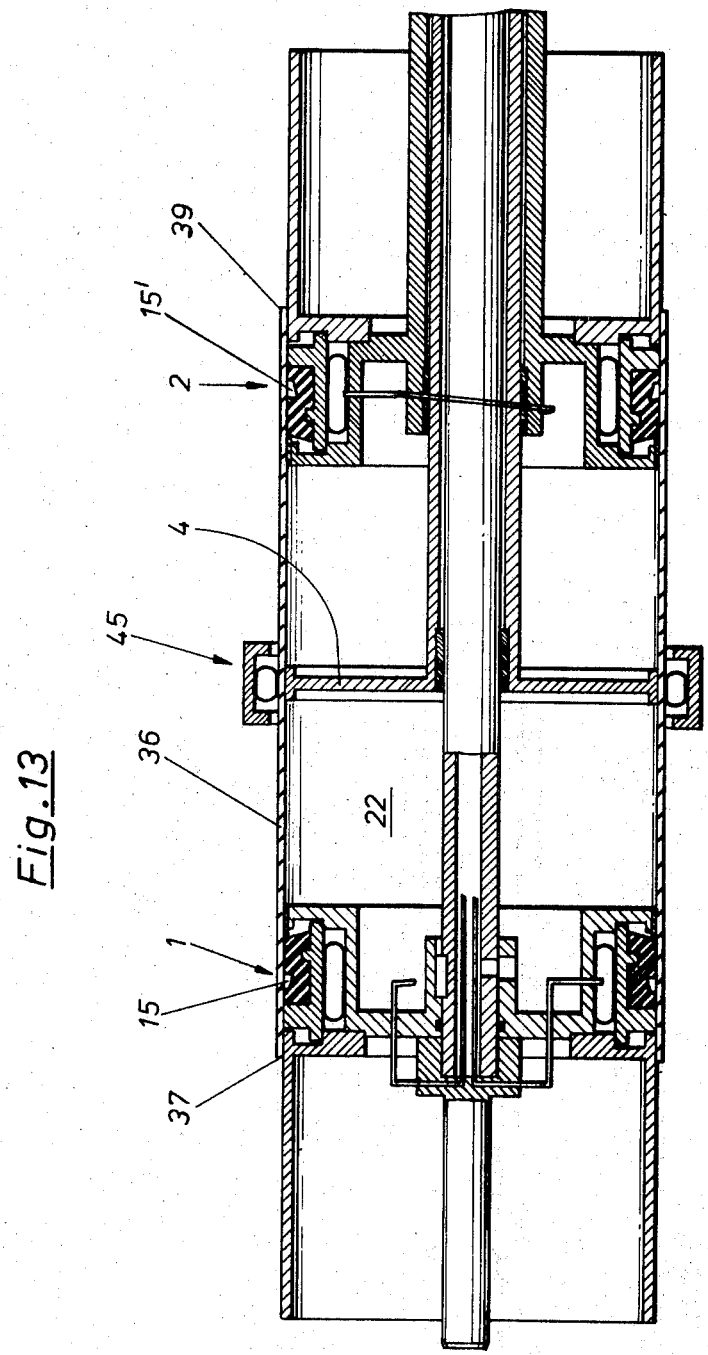

When the condition shown in FIG. 13 has been achieved, bead cores are placed over the annular grooves 15, 15' and the bead holders 1 and 2 are expanded radially, so that the bead cores press the tyre band 36 into the annular grooves 15, 15'. The fastening device 45 was however previously removed. The bead holder parts 1 and 2 now move towards one another after a pressure medium has been introduced into the chamber 22.

Figure 14:
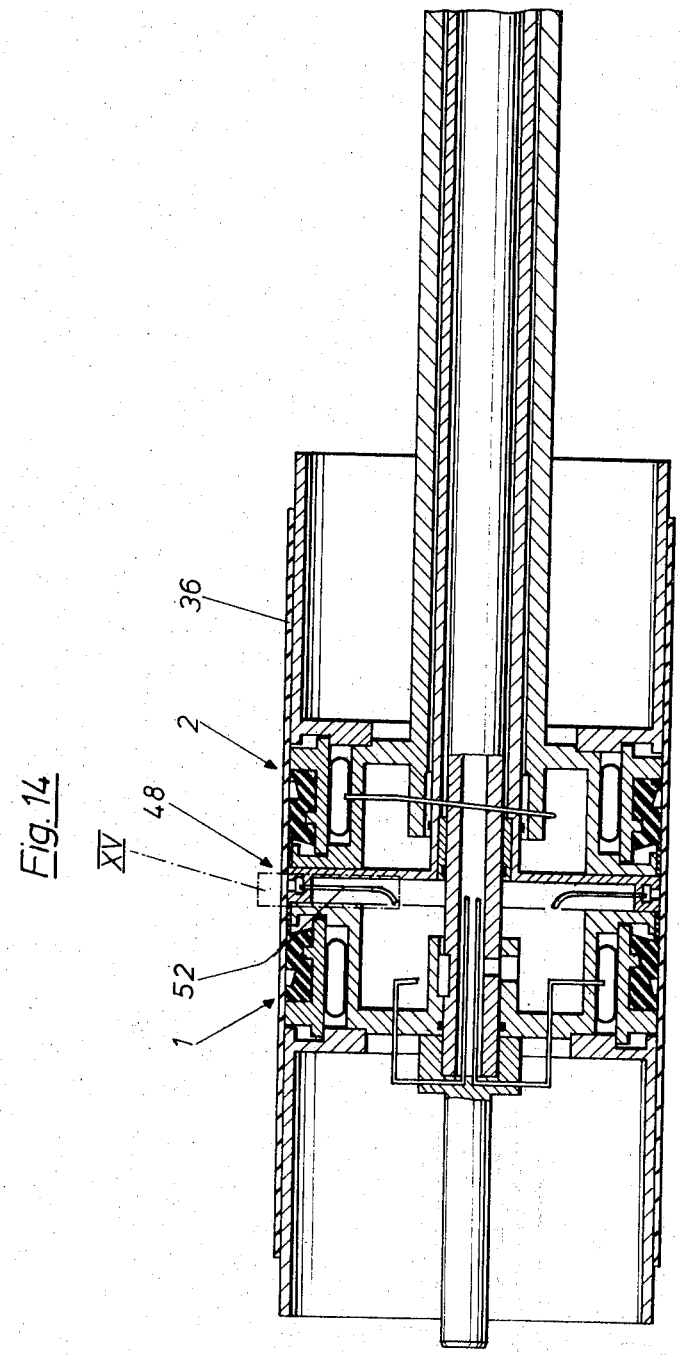
FIG. 14 illustrates a modification to the tyre-building drum shown in FIG. 11.

FIG. 14 illustrates a modified fastening device; the fastening device 48 consists of a suction device, which is illustrated in greater detail in FIG. 15. On the peripheral surface 35 of the supporting element 4 there are provided suction apertures 50 which lead into an annular chamber 51. An evacuation device 52 is connected to the chamber 51.

After a tyre band 36 has been laid in position, a partial vacuum is produced by exhausting the air in the chamber 51, whereupon atmospheric pressure presses the tyre band 36 against the suction apertures 50. The tyre band 36 is thereby fastened on the supporting element 4, so that the bead holder 1 and 2 can be moved outwards as shown in FIG. 13.

In the embodiment illustrated in FIGS. 1 to 10 a separate fastening device is not necessary, because fastening is effected by clamping on one bead holder. Instead of this clamping, however, it would also be possible to use a different fastening device, for example a fastening device of the type shown in FIGS. 12, 13 or 14, 15.

We claim:

1. A tire carcass building and shaping drum having two initially close-spaced bead holders, said bead holders being axially shiftable to increase the spacing therebetween, an extension drum being coaxially fixed to each of said bead holders and extending from the outer end thereof for supporting an end portion of said tire carcass axially slidably thereon, radially expandible elements on the periphery of said bead holders, said radially expandible elements having grooves and being expandible to bring said grooves into direct air-tight engagement with the tire carcass, said bead holders and tire carcass closing an air-tight space therewithin, means for introducing a pressure medium into said space, a supporting element for the tire carcass disposed between said bead holders, and a fastening means at said supporting element for axially fixing thereto of a tire carcass.

2. A tire carcass building and shaping drum according to claim 1, wherein said fastening means has a ring which surrounds the building and shaping drum and is provided with an element adapted to be pressed from the outside against the tire carcass.

3. Device for building and shaping of a blank for a belted tire, comprising a cylindrical mounting drum for mounting of a tire band, said mounting drum having two initially close-shaped bead holders, at least one of said bead holders being axially shiftable to increase the spacing between said bead holders, at least one extension drum being coaxially fixed to at least one of said bead holders and extending from the outer end thereof for supporting an end portion of said tire band axially slidably thereon, radially expandable elements on the periphery of said bead holders, said radially expandable elements having grooves and being expandable to bring said grooves into direct air-tight engagement with the tire band, said bead holders and tire band closing an air-tight space therewithin, means for introducing a pressure medium into said space, a supporting element for the tire band and which is disposed between said bead holders, and fastening means for axially fixing the tire band on a supporting element or a given bead holder to axially locate the tire band, wherein said fastening means comprises a fastening device having a ring which surrounds the mounting drum and includes an element adapted to be pressed from the outside against the tire band.

4. Device for building and shaping of a blank for a belted tire, comprising a cylindrical mounting drum for mounting of a tire band, said mounting drum having two initially close-spaced bead holders, at least one of said bead holders being axially shiftable to increase the spacing between said bead holders, at least one extension drum being coaxially fixed to at least one of said bead holders and extending from the outer end thereof for supporting an end portion of said tire band axially slidably thereon, radially expandable elements on the periphery of said bead holders, said radially expandable elements having grooves and being expandable to bring said grooves into direct air-tight engagement with the tire band, said bead holders and tire band closing an air-tight space therewithin, means for introducing a pressure medium into said space, a supporting element for the tire band and which is disposed between said bead holders, and fastening means for axially fixing the tire band on a supporting element or a given bead holder to axially locate the tire band, wherein said fastening means comprises a fastening device having suction apertures, a chamber and an evacuation device and being carried by one of said supporting element and bead holder, said apertures leading into said chamber which is connected to said evacuation device.

5. Device for building and shaping of a blank for a belted tire, comprising a cylindrical mounting drum for mounting of a tire band, said mounting drum having two initially close-spaced bead holders, at least one of said bead holders being axially shiftable to increase the spacing between said bead holders, an extension drum coaxially fixed to a said bead holder and extending from the outer end thereof for supporting an end portion of said tire band axially slidably thereon, radially expandable elements on the periphery of said bead holders, said radially expandable elements having grooves and being expandable to bring said grooves into direct air-tight engagement with the tire band, said bead holders and tire band closing an air-tight space therewithin, means for introducing a pressure medium into said space, a supporting element for the tire band and which is disposed between said bead holders, and fastening means for axially fixing the tire band on a supporting element or a given bead holder to axially locate the tire band, only one of the bead holders having an extension drum and the other bead holder being provided with said fastening means for the axial fastening thereto of the tire band, wherein a movable support is provided for the supporting element and other bead holder and said one bead holder is axially stationary.

6. Device according to claim 5, wherein said extension drum has a closed, jointless peripheral surface and is of one piece.

7. Device according to claim 7, wherein the fastening means comprises a bead core surrounding said radially expandable element of said other bead holder and fixing said tire band therebetween upon expansion of said last mentioned expandable element for pulling said tire band substantially off said single extension drum and locating the trailing end thereof on said one bead holder for thereafter allowing application of a further bead core at said one bead holder.

8. Device for building and shaping of a blank for a belted tire, comprising a cylindrical mounting drum for mounting of a tire band, said mounting drum having two initially close-spaced bead holders, at least one of said bead holders being axially shiftable to increase the spacing between said bead holders, an extension drum coaxially fixed to a said bead holder and extending from the outer end thereof for supporting an end portion of said tire band axially slidably thereon, radially expandable elements on the periphery of said bead holders, said radially expandable elements having grooves and being expandable to bring said grooves into direct air-tight engagement with tire band, said bead holders and tire band closing an air-tight space therewithin, means for introducing a pressure medium into said space, a supporting element for the tire band and which is disposed between said bead holders, and fastening means for axially fixing the tire band on a supporting element or a given bead holder to axially locate the tire band, only one of the bead holders having an extension drum and the other bead holder being provided with said fastening means for the axial fastening thereto of the tire band, said fastening means comprising a bead core surrounding said radially expandable element of said other bead holder and fixing said tire band therebetween upon expansion of said last mentioned expandable element for pulling said tire band substantially off said single extension drum and locating the trailing end thereof on said one bead holder for thereafter allowing application of a further bead core at said one bead holder, including means for moving said support element axially toward and away from said one bead holder upon corresponding relative movement between said bead holders and at a fraction of the speed thereof.

9. Device for building and shaping of a blank for a belted tire, comprising a cylindrical mounting drum for mounting of a tire band, said mounting drum having two initially close-spaced bead holders, at least one of said bead holders being axially shiftable to increase the spacing between said bead holders, an extension drum being associated with and coaxially fixed to each bead holder and extending from the outer end thereof for supporting an end portion of said tire band axially slidably thereon, radially expandible elements on the periphery of said bead holders, said radially expandible elements having grooves and being expandible to bring said grooves into direct air-tight engagement with the tire band, said bead holders and tire band closing an air-tight space therewithin, means for introducing a pressure medium into said space, a supporting element for the tire band and which is disposed between said bead holders, and fastening means for axially bead fixing and locating the tire band, said fastening means comprising a fastening device at said supporting element for axial fastening thereto of the tire band.

10. Device according to claim 9, wherein the fastening device has a ring which surrounds the mounting drum and is provided with an element adapted to be pressed from the outside against a tire band.

11. Device according to claim 10, including means for moving said bead holders axially in opposite directions away from said supporting element.

12. Device according to claim 9, including an inner shaft, a hollow intermediate shaft and a hollow outer shaft arranged telescopingly and relatively slidably, one said bead holder being carried by said inner shaft, said support element being carried by and adjacent the end of said intermediate shaft, said outer shaft carrying the other bead holder adjacent the end of said outer shaft to permit close axial spacing of the peripheries of said bead holders and support element upon sliding of said shafts one into the other.

13. Device according to claim 9, wherein said bead holders comprise radially inner and outer portions, the radially inner portions defining chamber portions radially inward of said outer portions and opening axially toward the support element located therebetween, said bead holders in their initial close-spaced position having axially facing walls on the radially outer portions thereof engageable with the periphery of said support element located therebetween for defining a substantially axially continuous peripheral wall for radially supporting the central portion of the tire band thereon, said bead holders having the outer portions thereof axially spaced from the periphery of said support element upon being axially shifted to increase said spacing therebetween, and said chamber portions thereby being enlarged to extend radially to the tire band.

14. Device according to claim 13, in which said radially expandible elements on said bead holders each include a circumferentially continuous resilient part incorporating said groove and being recessed in and radially expandible from said outer portion of the corresponding bead holder, said continuous resilient part having a substantially conical surface at the axially inner end thereof, a seal band on said outer portion having an edge slidable against such conical surface during expansion and contraction of said continuous resilient part for preventing pressure medium flow therepast between the exterior of the mounting drum and said chamber portion despite radial expansion and contraction of said continuous resilient portion.

15. Device for building and shaping of a blank for a belted tire, said blank having a central portion flanked by bead receiving end portions, said device comprising an axially segmented cylindrical mounting drum having a rigid and substantially continuous but axially segmented peripheral surface for directly contacting and supporting the length of a tire band, said mounting drum having one segment of said substantially continuous peripheral surface which comprises two initially close-spaced bead holders, said mounting drum having only one extension drum, said one extension drum defining the remaining segment of said substantially continuous peripheral surface and being coaxially fixed to one of said bead holders and extending from the outer end thereof to an extent sufficient for supporting a corresponding bead receiving end portion and the major part of said central portion of said tire band directly axially slidably thereon with the other bead receiving end portion on the other said bead holder, means axially shiftably supporting the extension drum for separating said bead holders and sliding said corresponding bead receiving end portion from said extension drum to the bead holder fixed thereto, radially expandible elements on the periphery of said bead holders, said radially expandible elements having grooves and being expandible to bring said grooves into direct air-tight engagement with the tire band, said bead holders and tire band directly closing an air-tight space therewithin, means for introducing a pressure medium into said space to expand said tire band to torodial shape, said other bead holder being provided with fastening means for allowing said axial movement of the extension drum relative to the tire band by axially fixing the tire band.

* * * * *

UNITED STATES PATENT OFFICE
CERTIFICATE OF CORRECTION

Patent No. 3,862,871          Dated January 28, 1975

Inventor(s) Gerhard Held and Walter Balle

It is certified that error appears in the above-identified patent and that said Letters Patent are hereby corrected as shown below:

Column 9, line 12, cancel "bead" (second occurrence).

Column 10, lines 15 through 47, cancel Claim 15 in its entirety.

Signed and Sealed this twenty-seventh Day of April 1976

[SEAL]

Attest:

RUTH C. MASON
*Attesting Officer*

C. MARSHALL DANN
*Commissioner of Patents and Trademarks*